(12) United States Patent
Miller (10) Patent No.: US 11,579,403 B2
(45) Date of Patent: Feb. 14, 2023

(54) 2D BI-POD FLEXURE DESIGN, MOUNT TECHNIQUE AND PROCESS FOR IMPLEMENTATION

(71) Applicant: Raytheon Company, Waltham, MA (US)

(72) Inventor: Kirk A. Miller, Dallas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/538,857

(22) Filed: Nov. 30, 2021

(65) Prior Publication Data

US 2022/0146786 A1  May 12, 2022

Related U.S. Application Data

(62) Division of application No. 15/845,981, filed on Dec. 18, 2017, now Pat. No. 11,187,871.

(51) Int. Cl.
*G02B 7/182* (2021.01)
*G02B 23/02* (2006.01)

(52) U.S. Cl.
CPC ........... *G02B 7/182* (2013.01); *G02B 7/1822* (2013.01); *G02B 7/1825* (2013.01); *G02B 23/02* (2013.01)

(58) Field of Classification Search
CPC .... G02B 7/182; G02B 7/1825; G02B 7/1822; G02B 23/02
USPC ........................................................ 359/871
See application file for complete search history.

(56) References Cited

U.S. PATENT DOCUMENTS

| | | | |
|---|---|---|---|
| 4,773,727 A | 9/1988 | Le Pivert et al. | |
| 5,004,205 A * | 4/1991 | Brown ................. | G02B 7/1825 403/57 |
| 5,624,175 A | 4/1997 | Gelormino et al. | |
| 5,801,891 A * | 9/1998 | Lloyd .................... | G02B 7/182 248/475.1 |
| 5,986,827 A * | 11/1999 | Hale ...................... | G02B 7/004 359/822 |
| 6,674,585 B1 | 1/2004 | Calvet et al. | |

(Continued)

FOREIGN PATENT DOCUMENTS

| EP | 1188668 A1 | 3/2002 |
|---|---|---|
| JP | 2001-033873 A | 2/2001 |
| WO | WO 2015/120977 A1 | 8/2015 |

OTHER PUBLICATIONS

Mammini et al., 3D-additive manufactured optical mount, Proceedings of SPIE, Sep. 2, 2015, 7 pages, vol. 9573, SPIE, Bellingham, Washington.

(Continued)

*Primary Examiner* — Stephone B Allen
*Assistant Examiner* — Rahman Abdur (57) ABSTRACT

A bipod flexure mount couples an optic to a base while isolating the optic from strain to resist wavefront error. The bipod flexure mount has a distal attachment pad to be coupled to the optic and a proximal attachment pad to be coupled to the base. A pair of beams extend between and couple the distal and proximal attachment pads. The distal attachment pad, the proximal attachment pad and the pair of beams are disposed in and define a planar layer with opposite planar surfaces that are substantially parallel. The bipod flexure mount is relatively flexible about four degrees of freedom and is relatively stiff about two degrees of freedom.

10 Claims, 11 Drawing Sheets

(56) References Cited

U.S. PATENT DOCUMENTS

| | | | |
|---|---|---|---|
| 6,679,455 | B2 | 1/2004 | Chatenet |
| 7,001,051 | B2 | 2/2006 | Palmer et al. |
| 7,813,033 | B1 * | 10/2010 | Blanding ............. G02B 6/4226 359/328 |
| 7,900,390 | B2 | 3/2011 | Moody et al. |
| 8,674,460 | B2 | 3/2014 | Gutierrez et al. |
| 2007/0014037 | A1 * | 1/2007 | Frommeyer ........... G02B 7/182 359/819 |
| 2010/0202071 | A1 | 8/2010 | Preumont et al. |
| 2010/0329775 | A1 | 12/2010 | Blanding et al. |
| 2012/0208440 | A1 | 8/2012 | Goldsmith et al. |
| 2018/0005655 | A1 | 1/2018 | Swanson et al. |
| 2018/0024438 | A1 | 1/2018 | Kugler et al. |

OTHER PUBLICATIONS

Salek, Flexure Mounts For High Resolution Optical Elements, Review of: Vukobratovich, Richard R M, Jan. 1988, 28 pages, Proc of SPIE vol. 0959.
International Search Report for International Application No. PCT/US2018/055511 dated Jan. 25, 2019, 16 pages.

* cited by examiner

*Fig. 12*

2D BI-POD FLEXURE DESIGN, MOUNT TECHNIQUE AND PROCESS FOR IMPLEMENTATION

RELATED APPLICATIONS

This is a divisional application of U.S. application Ser. No. 15/845,981, filed Dec. 18, 2017, entitled "2D Bi-Pod Flexure Design, Mount Technique and Process for Implementation", which is incorporated by reference in its entirety herein.

BACKGROUND

Certain structures, such as reflective optics, are sensitive to deformations. Some optics are expected to be good within a fraction of a wavelength in visible light. Interface imperfections between such structures, or mounting imperfections between such structures, can cause deformations. For example, interface imperfections between the optic and its base, or between the optic and other functional components, can cause optic deformations. Such deformations can increase wavefront error to unacceptable levels.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1b is a front view of the bipod flexure mount of FIG. 1a;

FIG. 2b is a front view of the bipod flexure mount of FIG. 2a;

FIG. 6b is an exploded view of the first optical element, the bipod flexure mounts of FIG. 1a, and the first fixture of FIG. 6a;

FIG. 7b is an exploded view of the second optical element, the bipod flexure mounts of FIG. 2a, and the second fixture of FIG. 6a;

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one example, there is provided a bipod flexure mount that can be used to secure one structure to another. By way of example in the present description, the bipod flexure mounts are shown and described securing an optical element, such as a mirror, to a base or housing to form an optical assembly of an optical system, such as a reflective telescope. The terms "optical element" and "optic" are used interchangeably herein. In addition, the terms "bipod flexure mount," "mount," and "flexure" are used interchangeably herein. The bipod flexure mounts can hold the optical element or mirror in a correct position while simultaneously isolating the optical element or mirror from localized moment strain which increases wavefront error. In addition, the bipod flexure mounts can hold the optic element without interface imperfections distorting the reflection characteristics of the mirror. The bipod flexure mounts can be formed by chemical etching in a photolithography process, and can be tangentially bonded to the optical element or mirror in at least three equally spaced locations. The optical element, with the flexures secured thereto, can be bonded to the base or housing using either a transfer alignment fixture or after micro positioning for best optical alignment. Adhesive can be injecting using a manifold to uniformly distribute the adhesive and resist distortion of the bipod flexure mounts. The bipod flexure mounts can have a slender aspect ratio and multiple spokes so that a relatively low torsional stiffness is achieved in three orthogonal directions, and so that one (of three) linear stiffness is also relatively low.

The present description provides two examples of bipod flexure mounts mounting optical elements to a base, namely a housing of a telescope. In the first example, first bipod flexure mounts (FIGS. 1a and 1b) are part of a first optical assembly (FIGS. 3a, 3b, 4 and 5) to couple a first optical element to the base or housing. A method for assembling the first optical assembly is also described with reference to FIGS. 6a, 6b, 8, 9, 10 and 11. In the second example, second bipod flexure mounts (FIGS. 2a and 2b) are part of a second optical assembly (FIGS. 4 and 5) to couple a second optical element to the base or housing. A similar method can be used to assemble the second optical assembly with reference to FIGS. 7a, 7b, 10 and 11. Thus, both optical elements are coupled to the base or housing with the first and second bipod flexure mounts.

Figure 1A:
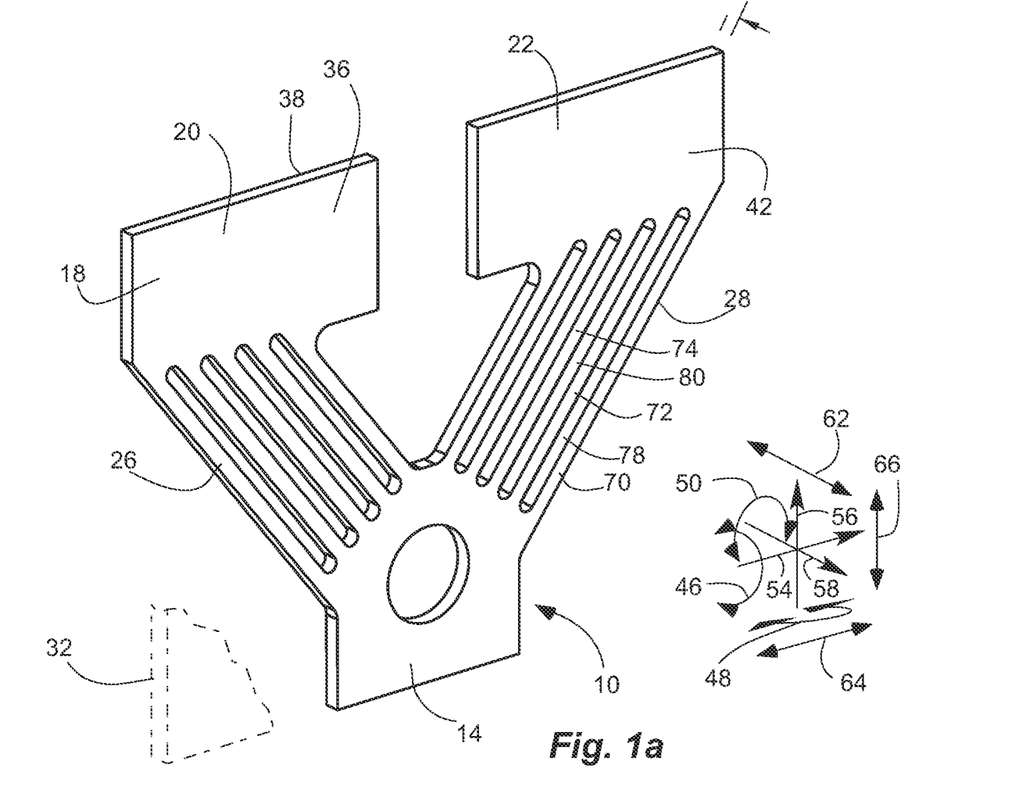
FIG. 1a is a perspective view of a bipod flexure mount in accordance with an example of the present disclosure.
Figure 1B:
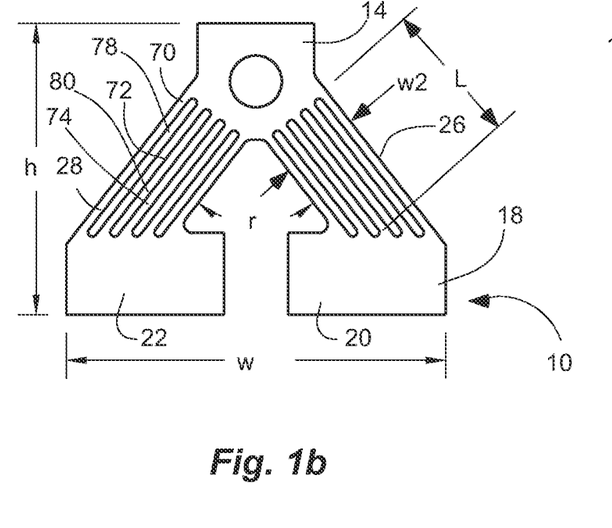

FIG. 1a depicts a perspective view of a bipod flexure mount 10 or flexure; while FIG. 1b depicts front view of the bipod flexure mount 10 or flexure. As described in greater detail below, multiple bipod flexure mounts 10 can be used to secure two structures, such as an optical element to a base or housing. The bipod flexure mount 10 has a distal attachment pad 14 to be coupled to a distal structure, such as the optical element, and a proximal attachment pad 18 to be coupled to a proximal structure, such as the base or housing. In one aspect, the proximal attachment pad 18 can comprise a pair of proximal attachment pads 20 and 22, separate and distinct from one another, and spaced-apart from one another by a gap. Thus, in another aspect, the proximal attachment pad 18, or attachment pads 20 and 22, can have a width w wider than the distal attachment pad 14, in a lateral direction orthogonal to a height h in the direction of the distal and proximal pads 14 and 18. In another aspect, the proximal pad can be a single wider pad. The pads 14 and 18 (or 20 and 22) can have broad surfaces to facilitate attachment of the pads 14 and 18 (or 20 and 22) with respect to other structures. In one aspect, an aperture can be formed in the pads 14 and 18 (or 20 and 22) to receive a mechanical fastener, such as a bolt or screw, as shown with respect to distal attachment pad 14. In another aspect, the pads 14 and 18 (or 20 and 22) can have a larger surface area (compared to the beams as discussed below) to receive an adhesive.

A pair of beams 26 and 28 extend between and are couple to the distal and proximal attachment pads 14 and 18, or 14, 20 and 22. The beams 26 and 28 can be thin and long, and thus can be flexible to bend or deflect. The pair of beams 26 and 28 can be tapered or angled with respect to one another, and can be oriented or disposed at a non-parallel angle r with respect to one another. The beams 26 and 28 can be oriented at of angle r of approximately 75 degrees in one aspect, at an angle between 70 and 80 degrees in another aspect; and at an angle between 60 and 90 degrees in another aspect. In one aspect, each of the pair of beams 26 or 28 can have a constant width w2 along a length L thereof; with the length L of the beam being between the proximal and distal attachment pads 14 and 18 (or 20 or 22), and with the width w2 being perpendicular to the length L of the beam 26 or 28. Similarly, the beams 26 and 28 can have a constant cross-sectional shape and size along the length L thereof to facilitate quantifying flexure characteristics. The beams 26 and 28 can define a pair of legs of a bipod supporting the pads 14, 20 and 22 (or 18) with respect to one another. Thus, the bipod flexure mount 10 can have an overall triangular shape.

In another aspect, the pads 14 and 18 (or 20 and 22) can be discrete and distinct with respect to the beams 26 and 28, or can have a discrete and distinct shape and/or size with respect to the beams 26 and 28. The pads 14 or 18 (or 20 and 22) can be sized and shaped to secure the mount 10 to the structures, while the beams 26 and 28 can be sized and shaped to flex or resist flexing in desired orientations or directions, and thus have a desired stiffness and flexibility. For example, the pads 14 or 18 (or 20 and 22) can be wider than the beams 26 and 28 to create a broad surface area for fastening or bonding. Thus, the mount 10 can be configured to limit or restrict flexure to the beams 26 and 28, and resist or isolate such flexure from the pads 14 and 18 (or 20 and 22) to maintain the bonds. In addition, having discrete and distinct attachment pads 14 and 18 (or 20 and 22) can help identify the attachment portion of the mount 10 during assembly.

The bipod flexure mount 10, and the components thereof, can be flat and can be disposed in a planar layer defined by the thickness of the mount 10. The bipod flexure mount 10, and the components thereof, can have external, opposite surfaces that are planar and parallel with respect to one another. In one aspect, the components of the mount 10 can have forward external surfaces that are coplanar, or that share a first common plane, and opposite rearward external surfaces that are coplanar, or that share a second common plane that is parallel with and spaced-apart from the first common plane. Thus, the distal attachment pad 14, the proximal attachment pad 18 (or 20 and 22) and the pair of beams 26 and 28 can be disposed in and can define a planar layer 32 with opposite planar surfaces 36 and 38 that are substantially parallel with respect to one another.

In one aspect, the distal and proximal attachment pads 14 and 18 (or 20 and 22) and the pair of beams 26 and 28 each have opposite surfaces, including a front surface and a rear surface. The front surfaces can be coplanar or in common plane defining a front planar surface 36 of the planar layer 32, and the rear surfaces can be coplanar or in a common plane defining a rear planar surface 38 of the planar layer 32. In another aspect, the distal and proximal attachment pads 14 and 18 (or 20 and 22) and the pair of beams 26 and 28 can have the same thickness, and can define the thickness t of the planar layer 32.

In another aspect, the distal attachment pad 14, the proximal attachment pad 18 (or 20 and 22) and the pair of beams 26 and 28 can define a constant shape 42 between the opposite planar surfaces 36 and 38. Thus, the shape 42 of the mount 10 is constant from one surface 36 to the other 38, and through a thickness t of the planar layer 32. The constant shape 42 can facilitate quantifying flexure and stiffness characteristics of the mount 10.

In another aspect, the mount 10 is relatively thin, and has a thickness t that is much thinner than a height h and a width w of the mount 10. For example, the shape 42 and the mount 10 can have a height h and a width w at least an order of magnitude greater than a thickness t thereof (e.g. h and w>t×10). The height h is defined between the proximal and distal attachment pads 14 and 18 (or 20 and 22) (and oriented vertically in FIG. 1b); the width w is defined by the proximal attachment pad 18 (or 20 and 22) (and oriented horizontally in FIG. 1b); and the thickness t is defined between the opposite planer surfaces 36 and 38 of the planer layer 32 (or into and out of the page in FIG. 1b).

In one aspect, the planar layer 32 and the constant shape 42 can define a two-dimensional (2D) shape forming the entire bipod flexure mount 10. In another aspect, the bipod flexure mount 10, or the distal attachment pad 14, the proximal attachment pad 18 (or 20 and 22) and the pair of beams 26 and 28, can be formed together at the same time as a continuous, integral, and/or monolithic body. For example, the mount 10 and the constant shape 42 can be formed by chemical etching a planar material in a photolithography process.

The shape 42 and the dimensions h, w and t of the mount 10 define the flexure and stiffness characteristics, directions and orientations of the mount 10. The mount 10 and the shape 42 can have a relatively flexible torsional stiffness, represented by 46, 48 and 50, about three orthogonal axes including width, height and depth axes 54, 56 and 58 corresponding to the width w, the height h and the thickness t, respectively; and a relatively flexible translational stiffness, represented by 62, along the depth axis 58, and a relatively stiff translational stiffness, represented by 64 and 66, along the width and height axes 46 and 48. The relatively flexible torsional stiffness and relatively flexible translational stiffness is with respect to the relatively stiff translational stiffness, and vice versa. The mount 10 can have greater translational stiffness 64 and 66 along the width and height axes 46 and 48, and lesser torsional stiffness 46, 48 and 50 about the width, height and depth axes 54, 56 and 58, and lesser translational stiffness 62 along the depth axis 58. Thus, the mount 10 can be relatively flexible in four degrees of freedom, and relatively rigid or stiff in two degrees of freedom.

In another aspect, each of the pair of beams 26 and 28 can further comprise groups of beams or multiple spokes, e.g. 70, 72 and 74, extending in parallel between the distal and proximal attachment pads 14 and 18 (or 20 and 22), as discussed above with respect to the beams 26 and 28, and defining elongated gaps 78 and 80 or slots therebetween that extend through the planar layer 32. The spokes are represented at 70, 72 and 74 without numbering all the spokes individually. Similarly, the elongated gaps are represented at 78 and 80 without numbering all the gaps individually. The number and dimensions of the spokes 70, 72 and 74 and gaps 78 and 80 can be selected to achieve the desired flexure and stiffness characteristics of the mount 10 or the beams 26 and 28. In one aspect, the beams 26 and 28 can comprise at least two spokes 70 and 72, and at least one elongated gap 78. In another aspect, the beams 26 and 28 can comprise at least three spokes 70, 72 and 74, and at least two elongated gaps 78 and 80. In another aspect, the beams 26 and 28 can comprise at least four spokes, and at least three elongated gaps. In another aspect, the beams 26 and 28 can comprise at least five spokes, and at least four elongated gaps, as shown.

As described above with respect the beams 26 and 28, the spokes 70, 72 and 74 can be disposed in the planar layer 32, and can have opposite front and rear surfaces, with front planar surfaces 36 in common plane of the planar layer 32, and with rear planar surfaces 38 in a common plane of the planar layer 32, and having the same thickness t of the planar layer 32. In one aspect, the spokes 70, 72 and 74 can have a constant width along a length thereof, and a constant cross-sectional shape and size along the length thereof. Thus, the flexure characteristics of the spokes 70, 72 and 74, and the beams 26 and 28, can be quantified as desired, and flexure characteristics can be constant along the length thereof.

In one aspect, adjacent spokes, e.g. 70 and 72, or 72 and 74, can have different lengths. For example, outer spokes 70 can have a longer length than inner spokes 74. Similarly, adjacent gaps, e.g. 78 and 80, can have different lengths. For example, outer gaps 78 can have a longer length than inner gaps 80. The lengths of the spokes 70, 72 and 74 and the gaps 78 and 80 can be selected to determine the flexure characteristics of the mount 10 or the beams 26 and 28, and can be determined by the angle between the beams 26 and 28, and the shape of the pads 14 and 18 (or 20 and 22).

Figure 1C:
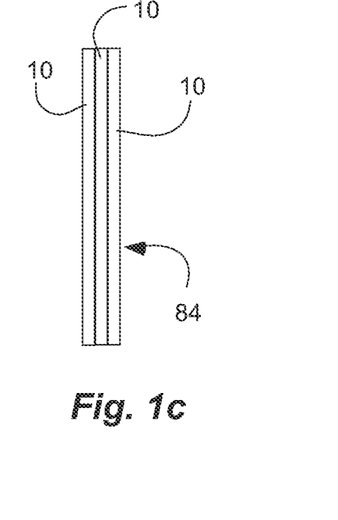
FIG. 1c is a side view of the bipod flexure mount of FIG. 1a, shown stacked together with multiple mounts to form a stack.

FIG. 1c depicts a side view of multiple mounts 10 stacked together in a stack 84. In one aspect, multiple mounts 10, with separate and distinct planar layers 32, can be stacked together. A number of mounts can be stacked together to obtain desired flexure and stiffness characterizes of the mount 10 or stack 84 of mounts. Stacking the mounts 10 together in the stack 84 can increase translational stiffness 64 and 66 along the width and height axes 46 and 48, while also increasing load carrying capacity, while continuing to minimize torsional stiffness 46, 48 and 50 about the width, height and depth axes 54, 56 and 58, and continuous to minimize translational stiffness 62 along the depth axis 58.

Figure 2A:
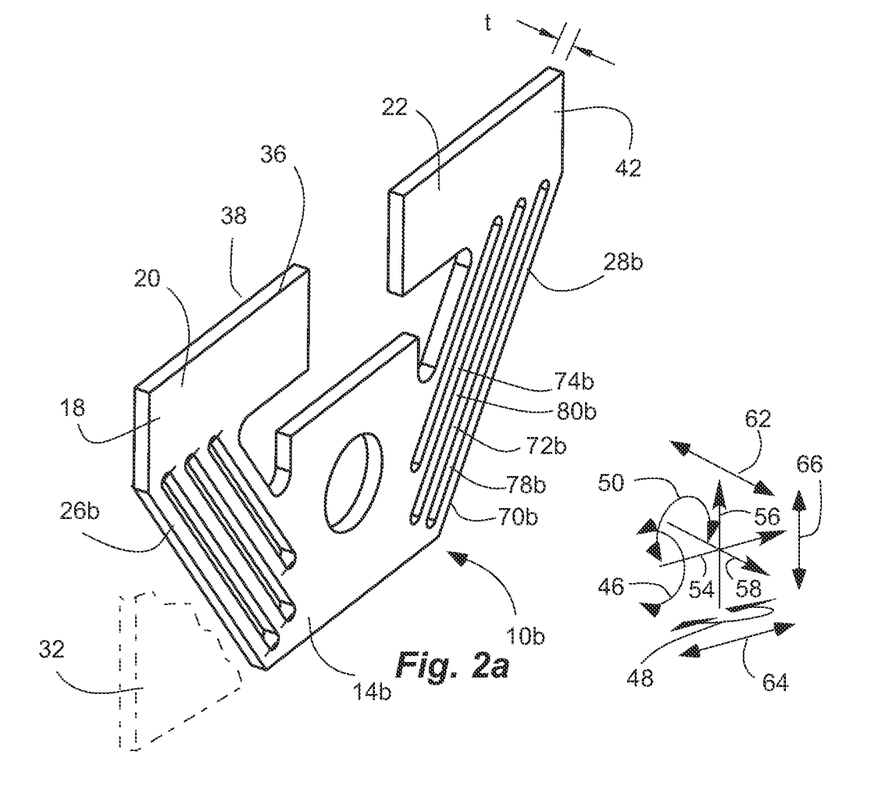
FIG. 2a is a perspective view of another bipod flexure mount in accordance with another example of the present disclosure.
Figure 2B:
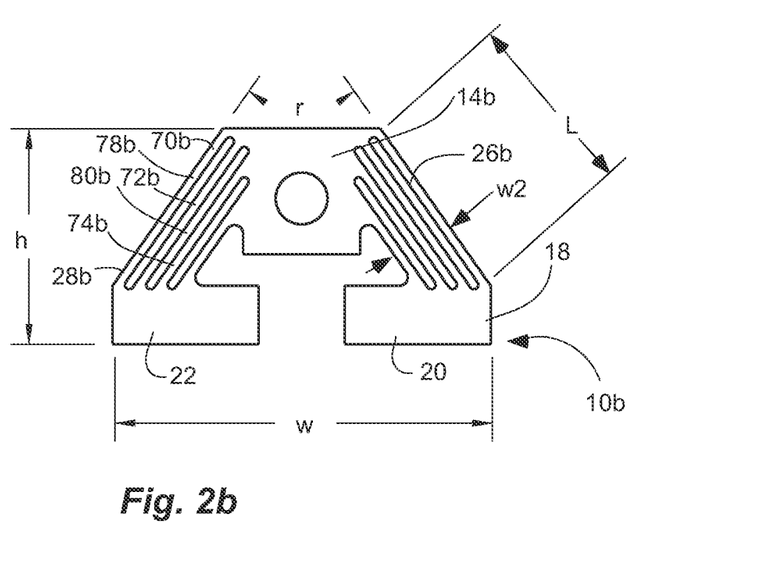

FIG. 2a depicts a perspective view of another more compact bipod flexure mount 10b or flexure; while FIG. 2b depicts front view of the bipod flexure mount 10b or flexure. The bipod flexure mount 10b of FIGS. 2a and 2b is similar in many respect to the bipod flexure mount 10 of FIGS. 1a and 1b, and the description thereof is hereby incorporated herein by reference. The bipod flexure mount 10b is more compact that the bipod flexure mount 10 described above. The bipod flexure mount 10b has a distal attachment pad 14b and a proximal attachment pad 18 or a pair of proximal attachment pads 20 and 22. A pair of beams 26b and 28b extend between and are couple to the distal and proximal attachment pads 14b and 18, or 14, 20 and 22. The beams 26b and 28b can be oriented at of angle r of approximately 70 degrees in one aspect; at an angle between 65 and 75 degrees in another aspect; and at an angle between 60 and 80 degrees in another aspect. The distal pad 14b, however, can be disposed between distal ends of the beams 26b and 28b Thus, the mount 10b can have a more compact shape and a reduced height h, while maintaining a length L of the beams 26b and 28b.

As described above, each of the pair of beams 26b and 28b can further comprise multiple spokes, e.g. 70b, 72b and 74b, extending in parallel between the distal and proximal attachment pads 14b and 18 (or 20 and 22), and defining elongated gaps 78b and 80b or slots therebetween. Again, the distal pad 14b can be disposed between distal ends of the spokes 70b, 72b and 74b In another aspect, adjacent spokes, e.g. 70b and 72b, can have the same or substantially the same lengths. Similarly, adjacent gaps, e.g. 78b and 80b, can have the same or substantially the same lengths. The lengths of the spokes 70b, 72b and 74b and the gaps 78b and 80b can be selected to determine the flexure characteristics of the mount 10b or the beams 26b and 28b, and can be determined by the angle between the beams 26b and 28b, and the shape of the pads 14b and 18 (or 20 and 22). Having the same lengths can facilitate quantifying the flexure and stiffness characteristics of the mount 10b or the beams 26b and 28b.

Figure 3A:
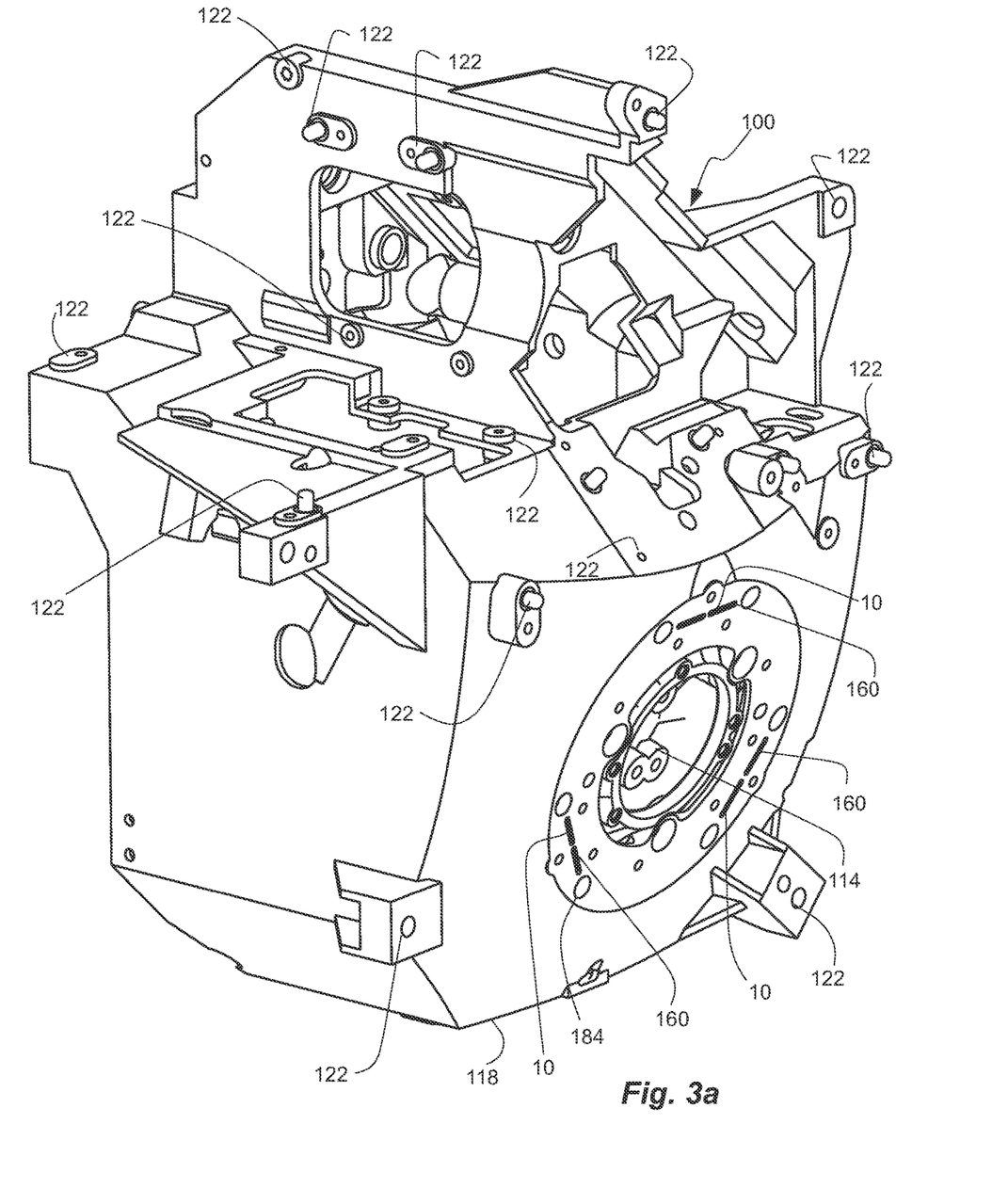
FIG. 3a is a rear perspective view of an optical system with bipod flexure mounts in accordance with FIG. 1a in accordance with an example of the present disclosure.
Figure 3B:
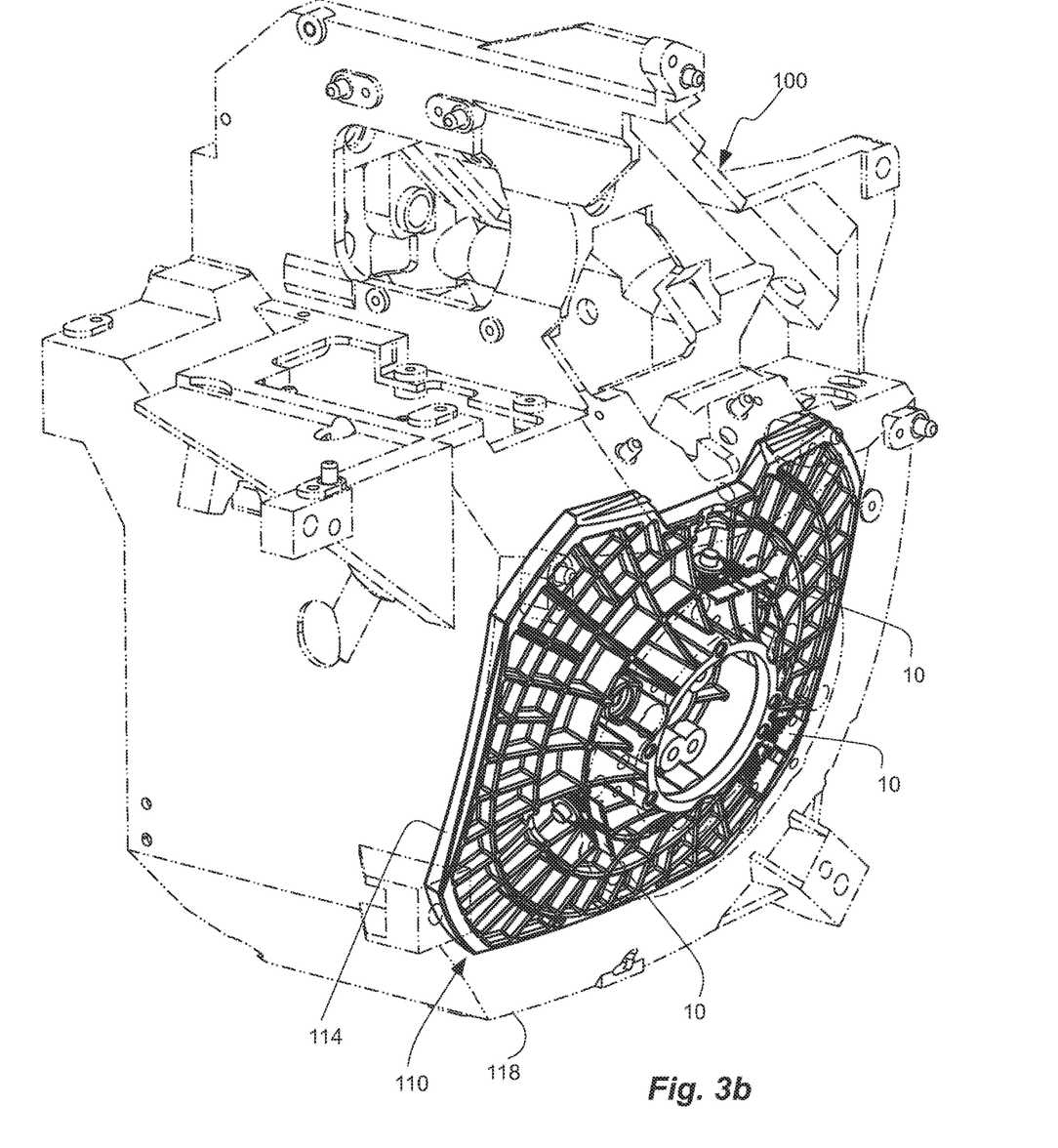
FIG. 3b is a rear perspective view of the optical system with an optical assembly with bipod flexure mounts in accordance with FIG. 1a in accordance with an example of the present disclosure (and with a base or housing of the optical system shown in phantom lines so that a first optical element and the bipod flexure mounts are visible therein)
Figure 4:
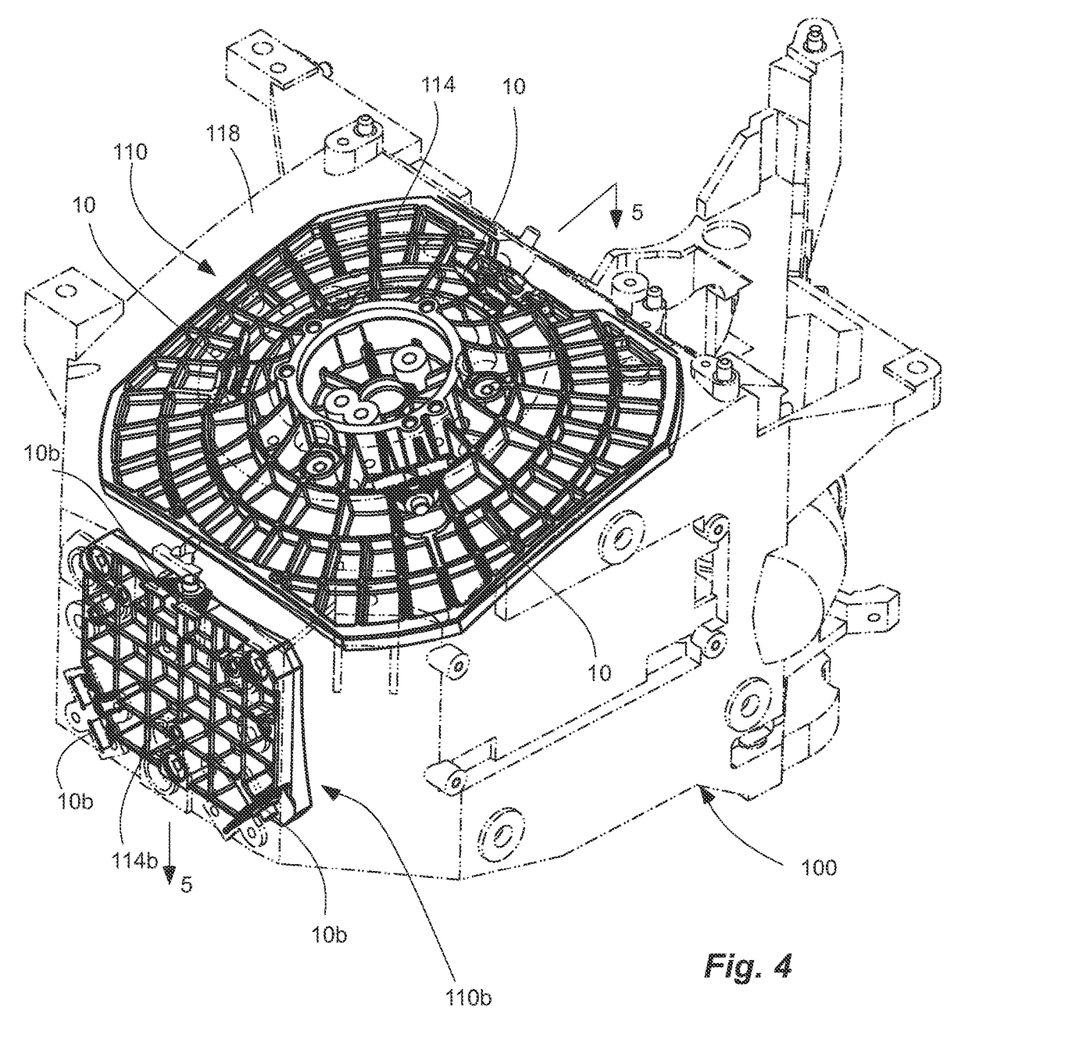
FIG. 4 is a bottom perspective view of the optical system of FIG. 3a, and of another optical assembly with bipod flexure mounts in accordance with FIG. 2a in accordance with an example of the present disclosure (and with the base or housing of the optical system shown in phantom lines so that first and second optical elements and the bipod flexure mounts are visible therein)
Figure 5:
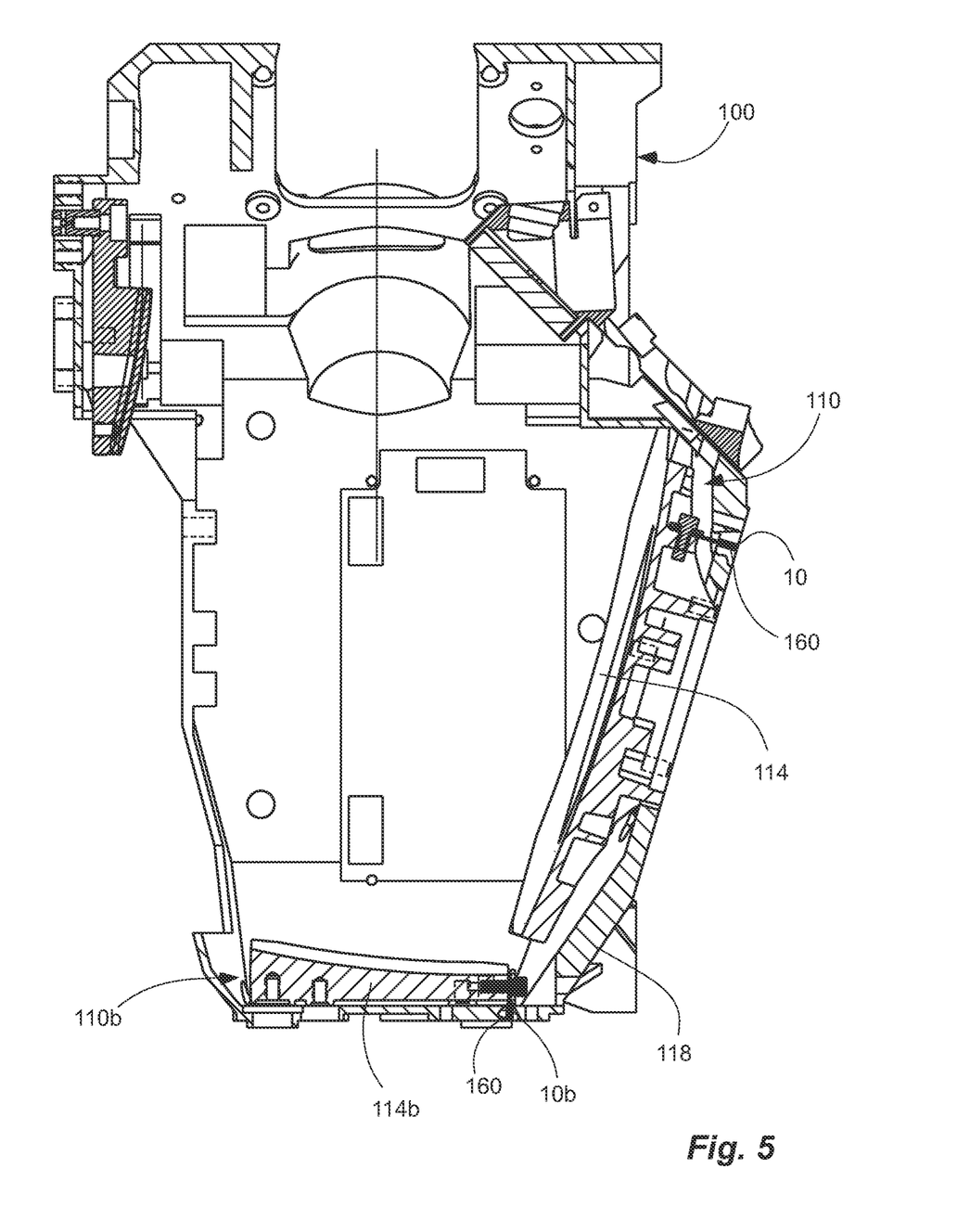
FIG. 5 is a cross-sectional side view of the optical system of FIG. 3a, taken along line 5 in FIG. 4.

FIG. 3a depicts an optical system 100, such as a telescope FIG. 3b depicts the optical system 100 with an optical assembly 110, or first optical assembly, therein utilizing bipod flexure mounts 10 as described above in FIGS. 1a and 1b to couple and secure a distal optic 114, or first optical element, to a proximal base 118 or housing. The proximal base 118 or housing is shown in phantom lines in FIG. 3b to be translucent to show the distal optic 114 and mounts 10 therein. Similarly. FIG. 4 depicts the optical system 100 with the first optical assembly 110, and a second optical assembly 110b utilizing bipod flexure mounts 10b as described above in FIGS. 2a and 2b to couple and secure a second distal optic 114b, or second optical element, to the proximal base 118 or housing. FIG. 5 depicts a cross-sectional side view of the optical system 100 taken along line 5 of FIG. 4 with the first and second optical assemblies 110 and 110b and with the first and second distal optics 114 and 114b therein, and coupled and secured to the proximal base 118 with mounts 10 and 10b, respectively.

Various subassembly components can attach to the base 118 or housing at various locations with fasteners in bores and/or pins, some of which are represented by way of example by 122 in FIG. 3a. As described above, interface imperfections between subassembly components and the base 118 or housing can warp or deform a reflective surface of the optics 114 or 114b, leading to increased and/or unacceptable levels of wavefront error. The mounts 10 or 10b can be used to mount the optics 114 or 114b to the base 118. The mounts 10 or 10b can be tangentially mounted to the optic 114 or 114b to minimize warping or deformation of the reflective surface. In addition, a plurality of mounts 10 or 10b, such as three, can be used to mount the optic 114 or 114b to the base 118. As described above, the mounts 10 and 10b can be relatively flexible in four degrees of freedom, and relatively rigid in two degrees of freedom. Thus, using three mounts 10 or 10b properly oriented with respect to one another, e.g. equally spaced about an axis, can achieve six degrees of relative rigidity or stiffness to secure the optic 114 or 114 to the base 118 and to correctly position the optic 114 or 114b, while isolating the optic 114 or 114b from moment strain and resisting wavefront error from the various components that attach to the base 118 or housing, represented at 122.

In one aspect, the distal optic 114 can be carried by the proximal base 118. Three bipod flexure mounts 10 can be coupled to and between the proximal base 118 and the distal optic 114. The mounts 10 can be oriented in a non-parallel orientation with respect to one another to couple the distal optic 114 to the proximal base 118. Similarly, the second distal optic 114b can be carried by the proximal base 118. Three bipod flexure mounts 10b can be coupled to and between the proximal base 118 and the second distal optic 114b. The mounts 10b can be oriented in a non-parallel orientation with respect to one another to couple the second distal optic 114b to the proximal base 118.

Figure 6A:
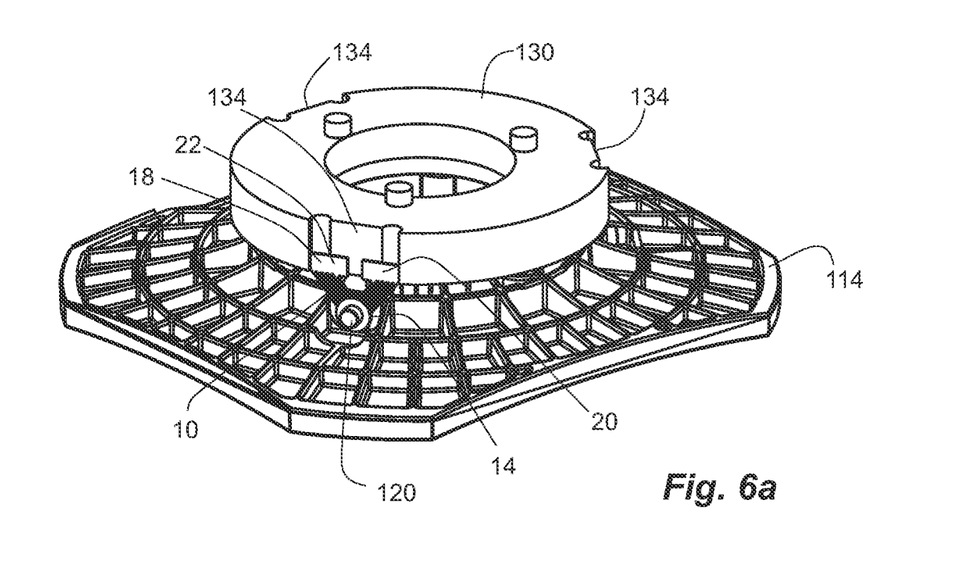
FIG. 6a is a bottom perspective view of a first optical element with the bipod flexure mount of FIG. 1a, and showing a method for assembling the optical assembly with a first fixture secured to the first optical element and aligning the bipod flexure mounts.
Figure 6B:
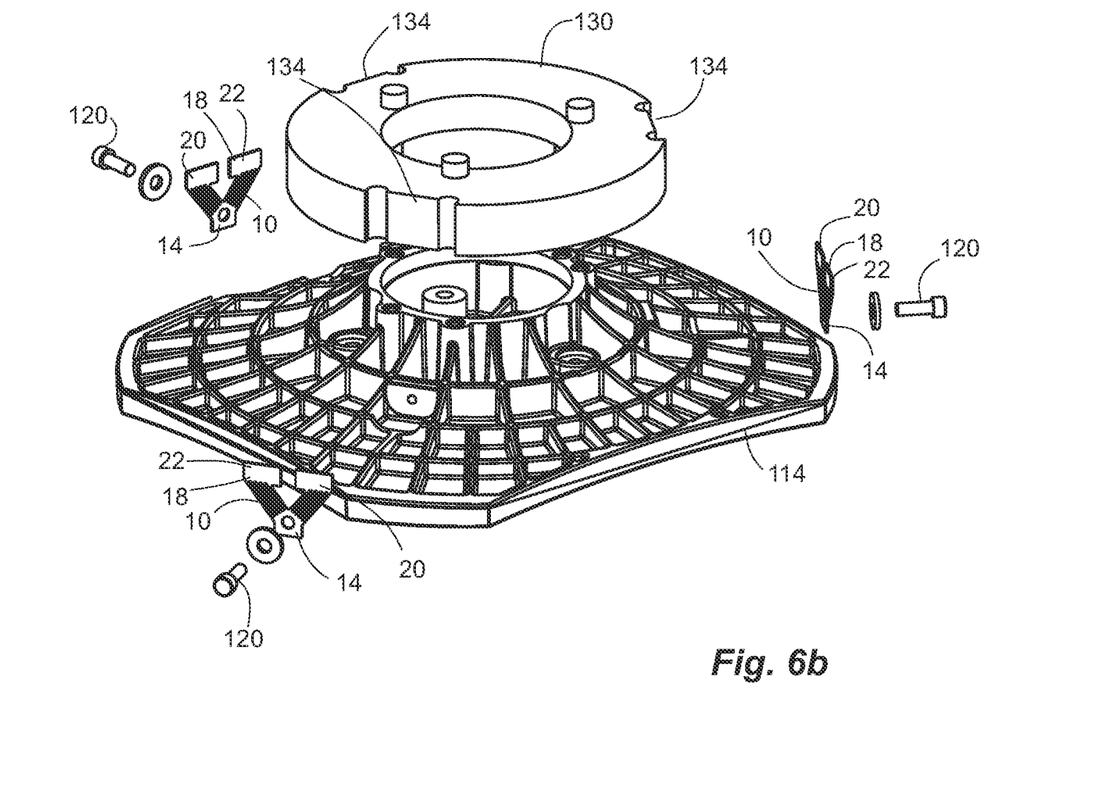

FIGS. 6a and 6b depict the attachment of the mounts 10 to the optic 114. In one aspect, the distal pads 14 of the mounts 10 can be secured to the optic 114 with mechanical attachments 120. e.g. screws, and adhesive attachment, e.g. adhesive. The distal pad 14 of the mount 10 can be tangentially secured to the optic 114.

FIGS. 6a and 6b also depict part of a method for assembling the optical assembly 110, and namely a method for fastening the mounts 10 to the optic 114. The mounts 10 can be fastened using a first fixture 130. The first fixture 130 can be sized and shaped to be removably mounted or releasably secured to the optic 114, such as with screws. The first fixture 130 can have alignment notches 134 therein corresponding to the location of the mounts 10 on the optic 114. Thus, the distal ends 14 of the mounts 10 can be fastened to the optic 114 with proximal ends 18 (or 20 and 22) aligned in the alignment notches 134 to orient the mounts 10 with respect to the optic 114 in the desired orientation. After the mounts 10 are fastened to the optic 114, and after adhesive cures, the first fixture 130 can be removed.

Figure 7A:
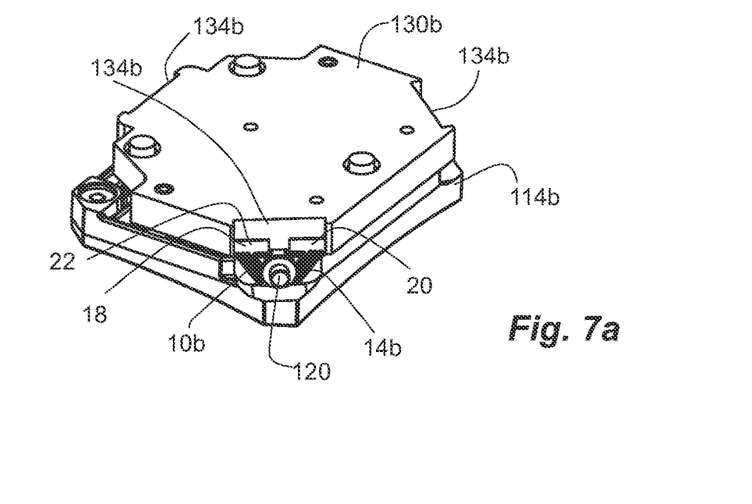
FIG. 7a is a bottom perspective view of a second optical element with the bipod flexure mount of FIG. 2a, and showing a method for assembling the optical assembly with a second fixture secured to the second optical element and aligning bipod flexure mounts.
Figure 7B:
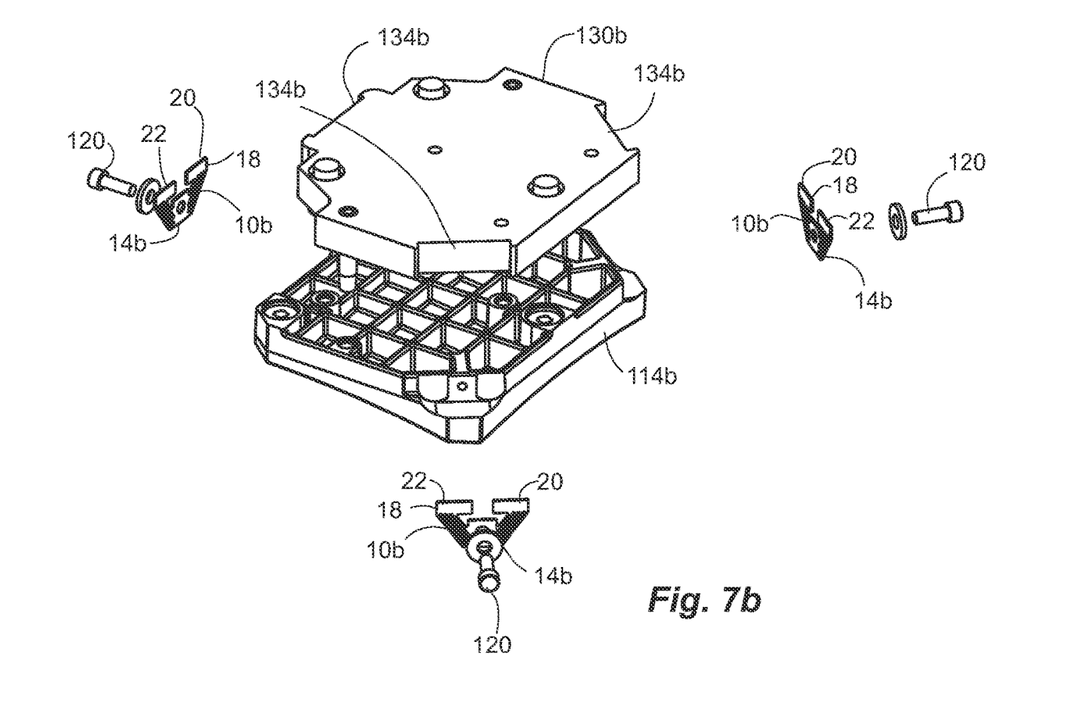

Similarly, FIGS. 7a and 7b depict the attachment of the mounts 10b to the second optic 114b. In one aspect, the distal pads 14b of the mounts 10b can be secured to the optic 114b with mechanical attachments 120, e.g. screws, (also shown in FIGS. 6a and 6b) and adhesive attachment, e.g. adhesive. The distal pad 14b of the mount 10b can be tangentially secured to the optic 114b.

FIGS. 7a and 7b also depict part of a method for assembling the optical assembly 110b, and namely a method for fastening the mounts 10b to the optic 114b. The mounts 10b can be fastened using a second fixture 130b. The second fixture 130b can be sized and shaped to be removably mounted or releasably secured to the optic 114b, such as with screws. The second fixture 130b can have alignment notches 134b therein corresponding to the location of the mounts 10b on the optic 114b. Thus, the distal ends 14b of the mounts 10b can be fastened to the optic 114b with proximal ends 18 (or 20 and 22) aligned in the alignment notches 134b to orient the mounts 10b with respect to the optic 114b in the desired orientation. After the mounts 10b are fastened to the optic 114b, and after adhesive cures, the second fixture 130b can be removed.

Figure 8:
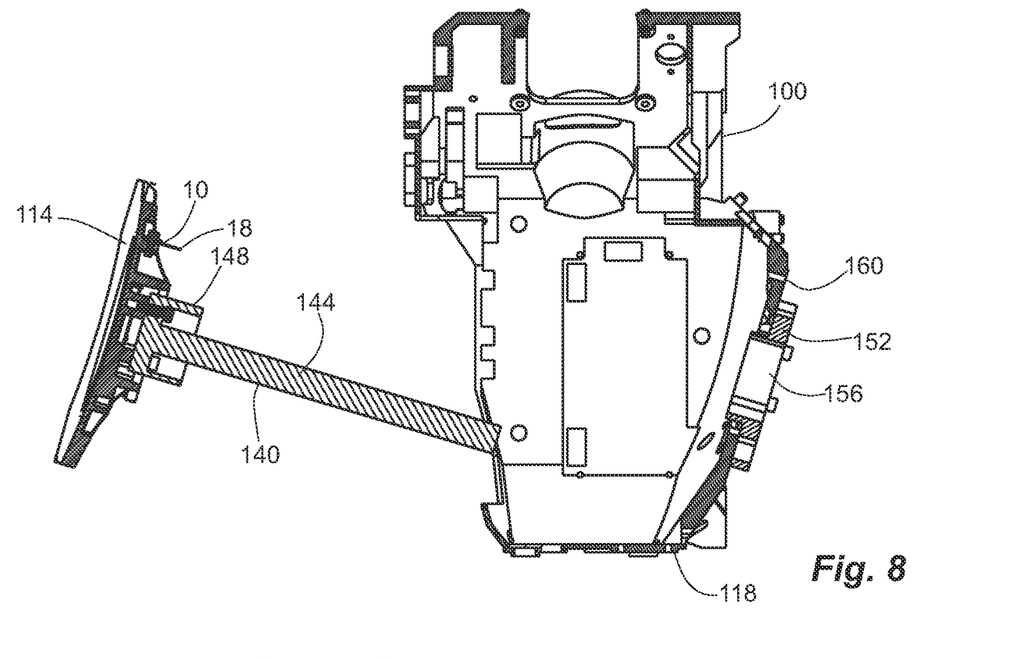
FIG. 8 is a cross-sectional side view of the optical system of FIG. 3a, and showing a method for assembling the optical assembly with an installation tool secured to the first optical element and a transfer alignment fixture secured to a base of the optical system to align bipod flexure members of FIG. 1a with the base.
Figure 9:
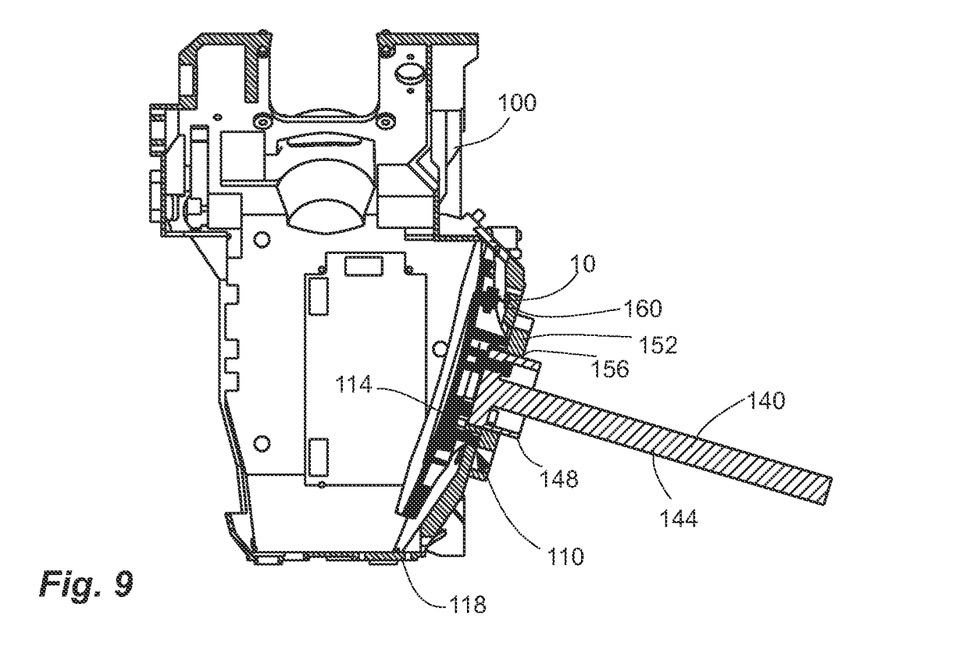
FIG. 9 is a cross-sectional side view of the optical system of FIG. 3a, and showing the method for assembling the optical assembly with the installation tool aligned with the transfer alignment fixture of FIG. 8.

FIGS. 8 and 9 depict part of a method for assembling the optical assembly 110. An installation tool 140 can be releasably secured to the optic 114, such as with screws. The installation tool 140 can have a handle 144 and a hub 148. A transfer alignment fixture 152 can be releasably secured to the base 118, such as with screws. The transfer alignment fixture 152 can have an aperture 156 therethrough. The hub 148 and the aperture 156 can have mating shapes and sizes. The handle 144 of the installation tool 140 can be passed through the aperture 156 in the transfer alignment fixture 152. The hub 148 of the installation tool 140 can be drawn into the aperture 156 of the transfer alignment fixture 152 to center and clock the optic 114 with respect to the base 118. In addition, the proximal end 18 (or 20 and 22) of the bipod flexure mount 10 can be drawn into a corresponding slot(s) 160 in the base 118 (also shown in FIG. 5). The installation tool 140 and the transfer alignment fixture 152 help align and insert the proximal ends 18 of the mounts 10 into the slots 160 without bending the mounts 10. The installation tool 140 can be removed from the optic 114. The optic 114 can be secured to the transfer alignment fixtures 152, such as with screws.

Figure 10:
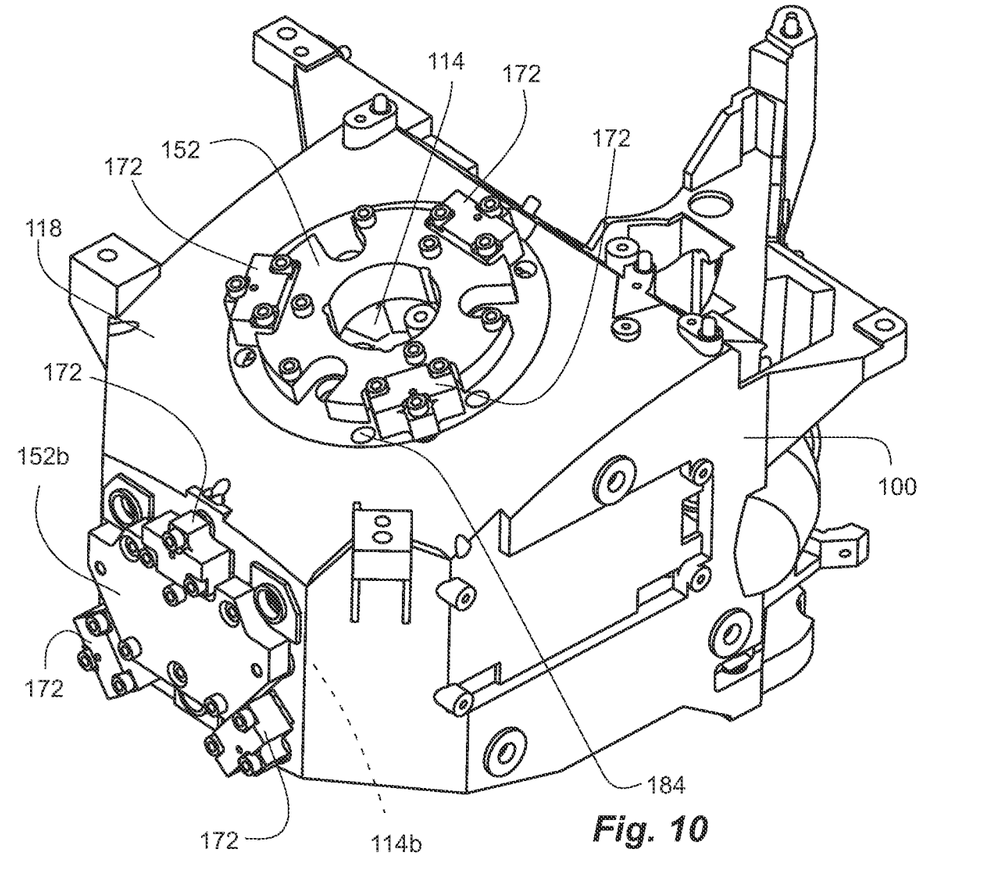
FIG. 10 is a bottom perspective view of the optical assemblies of FIG. 3a, and showing a method for assembling the optical assemblies with first and second transfer alignment fixture secured to the base of the optical system to align bipod flexure members of FIGS. 1a and 2a with the base, and with adhesive injection manifolds secured to the transfer alignment fixtures.

FIG. 10 depicts the transfer alignment fixture 152 temporarily secured to the base 118, and temporarily securing the first optic 114 to the base. In addition, a second alignment fixture 152b is temporarily secured to the base 118, and temporarily secures the second optic 114b (disposed in the base 118 or housing of the optical system 100) to the base 118. While the transfer alignment fixtures 152 and 152b are secured to the base 118, the optics 114 and 114b are secured to the alignment fixtures 152 and 152b, respectively. The proximal ends 18 (or 20 and 22) of the mounts 10 and 10b are aligned in slots 160 of the base 118, as shown in FIG. 12.

Figures 11, 12:
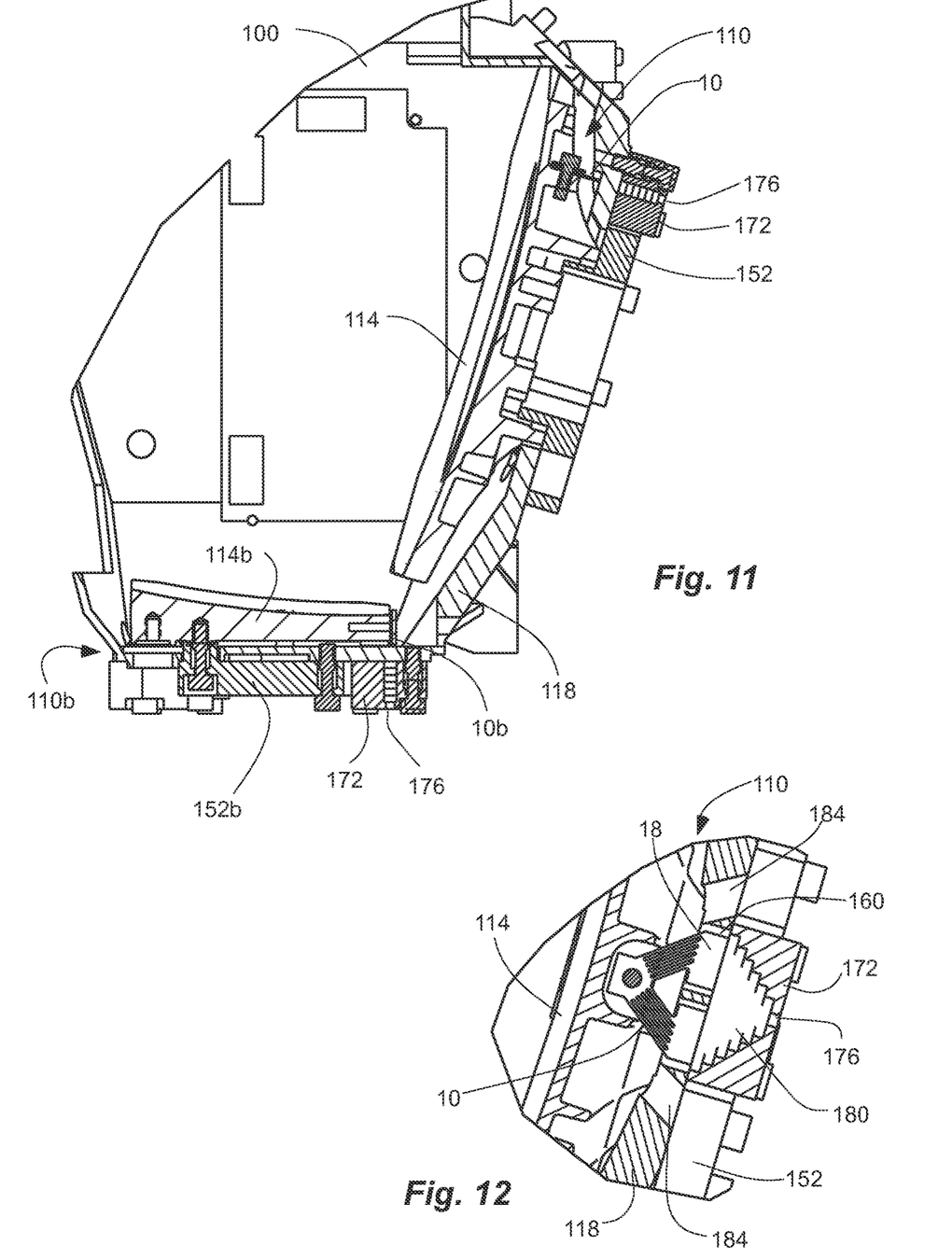
FIG. 11 is a partial cross-sectional side view of the optical system of FIG. 3a, and showing a method for assembling the optical assemblies with first and second transfer alignment fixture secured to the base of the optical system to align bipod flexure members of FIGS. 1a and 2a with the base.
FIG. 12 is a detailed cross-sectional side view of the optical system of FIG. 3a, and showing a method for assembling the optical assembly with an adhesive injection manifold secured to the transfer alignment fixture.

FIGS. 10, 11 and 12 depict another part of the method for assembling the optical assemblies 110 and 110b. The proximal ends 18 (or 20 and 22) of the bipod flexure mounts 10 and 10b can be fastened to the base 118, such as with adhesive. The mounts 10 and 10b can be flexible and subject to distortion by application of adhesive. Thus, injection manifolds 172 can be secured to the transfer alignment fixtures 152 and 152b, and over the slots 160 of the base 118. The injection manifolds 172 can each have an injection port 176 and an expanding chamber 180 (FIG. 11). The expanding chamber 180 can expand from the injection port 176 to the slot 160. Adhesive can be injected into the injection port 176 of the manifold 172 with the adhesive flowing through the expanding chamber 180 of the manifold 172 and into the slot 160 about the proximal end 18 (or 20 and 22) of the bipod flexure mounts 10 and 10b. The injection manifold 172 and the expanding chamber 180 allow the entire slot 160 to fill with adhesive simultaneously to avoid deforming the mount 10 and 10b. Witness apertures 184 can be formed in the base 118, and the transvers alignment fixtures 152 and 152b, to allow monitoring of the adhesive filling the slots 160. In one aspect, the proximal pads 18 (or 20 and 22) can be secured to the base 118 with adhesive attachment, e.g. adhesive. The adhesive can be epoxy, RTV, urethane, etc. The proximal pads 18 (or 20 and 22) can be disposed in slots 160 in the base 118. Until the adhesive adheres the proximal pads 18 to the base 118, no strain is placed upon the mounts 10 and 10b, and the optics 114 and 114b are held by the transfer alignment fixtures 152 and 152b. The transfer alignment fixtures 152 and 152b can be removed from the base 118 after adhesive cure.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology

What is claimed is:

1. A method for assembling an optical assembly within an optical system, the method comprising:
   releasably securing a first fixture to an optical element;
   fastening a distal end of a bipod flexure mount to the optical element with a proximal end of the bipod flexure mount aligned in an alignment notch in the first fixture to orient the bipod flexure mount with respect to the optical element in a desired orientation;
   removing the first fixture from the optical element after the bipod flexure mount is fastened to the optical element;
   releasably securing an installation tool to the optical element;
   releasably securing a transfer alignment fixture to a base of an optical system;
   drawing a hub of the installation tool into an aperture of the transfer alignment fixture to center and clock the optical element with respect to the base;
   drawing the proximal end of the bipod flexure mount into a corresponding slot in the base;
   fastening the proximal end of the bipod flexure mount to the base;
   removing the installation tool from the optical element; and
   removing the transfer alignment fixture from the base.

2. The method of claim 1, wherein fastening the proximal end of the bipod flexure mount base further comprises:
   securing an injection manifold to the transfer alignment fixture and over the slot of the base;
   injecting an adhesive into an injection port in the manifold with the adhesive flowing through an expanding chamber in the manifold and into the slot about the proximal end of the bipod flexure mount.

3. The method of claim 2, wherein removing the transfer alignment fixture from the base further comprises removing the transfer alignment fixture and the injection manifold upon the curing of the adhesive.

4. The method of claim 1, wherein fastening a distal end of a bipod flexure mount to the optical element further comprises tangentially fastening the distal end of the bipod flexure mount to the optical element.

5. The method of claim 1, further comprising passing a handle of the installation tool through an aperture in the transfer alignment fixture to facilitate the drawing of the hub of the installation tool into the aperture of the transfer alignment fixture.

6. The method of claim 1, wherein the bipod flexure mount comprises:
   a distal attachment pad defining the distal end;

a pair of proximal attachment pads, each defining the proximal end;

the proximal attachment pads being wider than the distal attachment pad; and a pair of beams extending directly between and coupling the distal attachment pad and the pair of proximal attachment pads, each of the pair of beams forming a beam flexure, wherein the proximal and distal attachment pads are distinct with respect to the pair of beams.

7. The method of claim 1, further comprising:

fastening respective distal ends of a second and a third bipod flexure mount to the optical element with respective proximal ends of the second and third bipod flexure mounts aligned in respective alignment notches in the first fixture to orient the second and third bipod flexure mounts with respect to the optical element in a desired orientation, wherein the removing of the first fixture from the optical element further comprises removing the first fixture from the optical element after the bipod flexure mount and the second and third bipod flexure mounts are fastened to the optical element.

8. The method of claim 7, wherein the drawing of the proximal end of the bipod flexure mount into a corresponding slot in the base further comprises drawing respective proximal ends of the second and third bipod flexure mounts into respective corresponding slots in the base.

9. The method of claim 8, further comprising fastening respective proximal ends of the second and third bipod flexure mounts to the base.

10. The method of claim 7, further comprising fastening the bipod flexure mount and the second and third bipod flexure mounts to the optical element at equally distanced annular positions from one another relative to a central axis.

* * * * *